United States Patent
Yousefi et al.

(10) Patent No.: US 12,533,326 B2
(45) Date of Patent: Jan. 27, 2026

(54) PREPARATION OF SOLUBLE FORM OF CURCUMIN

(71) Applicants: Gholamhossein Yousefi, Shiraz (IR); Mohsen Mohammady, Shiraz (IR); Seyed Iman Ghetmiri, Shiraz (IR)

(72) Inventors: Gholamhossein Yousefi, Shiraz (IR); Mohsen Mohammady, Shiraz (IR); Seyed Iman Ghetmiri, Shiraz (IR)

(73) Assignee: Salamat Pajoohan Parsian Pharmed (IR)

( * ) Notice: Subject to any disclaimer, the term of this patent is extended or adjusted under 35 U.S.C. 154(b) by 0 days.

(21) Appl. No.: 17/674,598

(22) Filed: Feb. 17, 2022

(65) Prior Publication Data

US 2022/0168239 A1    Jun. 2, 2022

Related U.S. Application Data

(60) Provisional application No. 63/151,815, filed on Feb. 22, 2021.

(51) Int. Cl.

| | | |
|---|---|---|
| *A61K 31/12* | (2006.01) | |
| *A61K 9/14* | (2006.01) | |
| *A61K 9/19* | (2006.01) | |
| *A61K 31/404* | (2006.01) | |
| *A61K 31/5377* | (2006.01) | |
| *A61K 47/10* | (2017.01) | |
| *A61K 47/12* | (2006.01) | |
| *A61K 47/20* | (2006.01) | |
| *A61K 47/32* | (2006.01) | |

(52) U.S. Cl.
CPC .............. *A61K 31/12* (2013.01); *A61K 9/145* (2013.01); *A61K 9/19* (2013.01); *A61K 31/404* (2013.01); *A61K 31/5377* (2013.01); *A61K 47/10* (2013.01); *A61K 47/12* (2013.01); *A61K 47/20* (2013.01); *A61K 47/32* (2013.01)

(58) Field of Classification Search
CPC ........ A61K 9/145; A61K 9/19; A61K 31/404; A61K 47/10; A61K 47/20; A61K 47/32; A61K 9/0019
See application file for complete search history.

(56) References Cited

U.S. PATENT DOCUMENTS

2012/0052095 A1*  3/2012  Chaniyilparampu .. A61K 45/06
514/355

OTHER PUBLICATIONS

Sanphui et al. Fast Dissolving Curcumin Cocrystals. Crystal growth & design. 2011 (Year: 2011).*
Gao et al. Preparation, characterization, pharmacokinetics, and tissue distribution of curcumin nanosuspension with TPGS as stabilizer Drug Development and Industrial Pharmacy, 2010 (Year: 2010).*
Kumar et al. Molecular complexation of curcumin with pH sensitive cationic copolymer enhances the aqueous solubility, stability and bioavailability of curcumin. European Journal of Pharmaceutical Sciences 2016 (Year: 2016).*
Bonaccorso et al. (Optimization of Curcumin Nanocrystals as Promising Strategy for Nose-to-Brain Delivery Application. Pharmaceutics. Published: May 23, 2020) (Year: 2020).*

* cited by examiner

*Primary Examiner* — Robert A Wax
*Assistant Examiner* — John Seungjai Kwon

(57) ABSTRACT

A curcumin nanococrystal composition including curcumin, a coformer, and a stabilizer. The coformer may include at least one of 3,5-dinitrobenzoicacid, gentisic acid, phloroglucinol, 4,4-bipyridine, tartaric acid, citric acid, and gallic acid. The curcumin nanococrystal composition has a particle size less than 10 nm, and the curcumin has a water-solubility between 5 mg/ml and 20 mg/ml.

11 Claims, 16 Drawing Sheets

PREPARATION OF SOLUBLE FORM OF CURCUMIN

CROSS-REFERENCE TO RELATED APPLICATION

This application claims the benefit of priority from U.S. Provisional Patent Application Ser. No. 63/151,815, filed on Feb. 22, 2021, and entitled "PREPARATION OF SOLUBLE FORM OF CARVEDILOL," which is incorporated herein by reference in its entirety.

TECHNICAL FIELD

The present disclosure generally relates to pharmaceutical nanotechnology, particularly to nanococrystal formulations, and more particularly to ultrafine nanococrystal formulations of drug substances with low water solubility.

BACKGROUND

Several pharmaceutical substances, such as carvedilol and curcumin, are highly lipophilic and have a low solubility in water, limiting the possibility of producing an injectable form for them. Advances in the pharmaceutical sciences have introduced numerous strategies to dissolve water-insoluble drugs, including micronization, salt formation, co-solvency, micellization, complex formation, and polymer-drug conjugation. Although these techniques have had a positive impact on therapeutic agents' bioavailability, they have their limitations. For example, as the most commonly used drug solubilization method, salt formation is restricted to the ionizable relatively weak acids and bases. Also, methods like micronization that affect drug particles' surfaces only improve the dissolution rate while the equilibrium dissolution remains unchanged. On the other hand, although complex formation by cyclodextrins and co-solvency methods increases solubility, they also decrease the permeability of drugs.

Regarding these water-insoluble compounds, researchers have reported many approaches to solve the problem of low water-solubility, such as using a pharmaceutically acceptable organic acid in formulations or forming crystalline hydrate and solvate forms of the lipophile drug. In other studies, extended-release and controlled-release compositions are disclosed with a primary goal of increasing a dissolution rate and controlling a release pattern of drugs to modify their pharmacokinetic behavior. However, achieving a small particle size of highly lipophilic drugs, which provides a sufficiently high water-solubility for an injectable form, remains challenging.

Cocrystals and nanocrystals are among the recently developed strategies. For example, cocrystals (CCs) have shown great capabilities to modify drugs' physicochemical properties, leading to increased solubility, dissolution rate, and bioavailability. Also, pharmaceutical nanocrystals (NCs) are colloidal dispersions of sizes less than 1000 nm, containing approximately 100% of the active drug substance stabilized by small amounts of polymers or surfactants. However, the solubility and physical stability resulting from these technologies are often insufficient, requiring an efficient approach to overcome these shortcomings.

Widespread use of water-insoluble drugs, such as using carvedilol in the treatment of heart failure (HF) and hypertension (HTN) and using curcumin in the prevention and treatment of a wide range of diseases, such as osteoarthritis, dyspepsia, hepatitis, cardiovascular diseases, hypercholesterolemia, cancers, and Alzheimer's disease, deficient and variable drug absorption of oral tablet administration, and lack of injectable form of a drug due to its low solubility requires new techniques for these problems. Hence, there is a need for a cost-effective and efficient method for preparing a soluble form of water-insoluble drugs, such as carvedilol and curcumin, with high physical and chemical stability for intravenous administration. Also, there is a need for an efficient solubilizing method lacking the limitations of routine solubilization methods such as decreasing the permeability of drugs and being restricted to ionizable insoluble drugs.

SUMMARY

This summary is intended to provide an overview of the subject matter of the present disclosure and is not intended to identify essential elements or key elements of the subject matter, nor is it intended to be used to determine the scope of the claimed implementations. The proper scope of the present disclosure may be ascertained from the claims set forth below in view of the detailed description below and the drawings.

In one general aspect, the present disclosure describes an exemplary curcumin nanococrystal composition, including curcumin, a coformer, and a stabilizer. In an exemplary embodiment, the coformer may include at least one of 3,5-dinitrobenzoicacid, gentisic acid, phloroglucinol, 4,4-bipyridine, tartaric acid, citric acid, and gallic acid. In an exemplary embodiment, exemplary curcumin nanococrystal composition may have a particle size less than about 10 nm. In an exemplary embodiment, exemplary curcumin nanococrystal composition may have a particle size less than about 1 nm. In an exemplary embodiment, curcumin of an exemplary curcumin nanococrystal composition may have a water-solubility between about 5 mg/ml and about 20 mg/ml.

In an exemplary embodiment, exemplary curcumin nanococrystal composition may include the curcumin and the coformer with a weight ratio the curcumin to the coformer between about 0.15 and about 1.5. In an exemplary embodiment, exemplary curcumin nanococrystal composition may include the curcumin with a concentration between about 5% and about 70% of weight of the curcumin nanococrystal composition. In an exemplary embodiment, exemplary curcumin nanococrystal composition comprises the coformer with a concentration between about 3% and about 35% of weight of the curcumin nanococrystal composition.

In an exemplary embodiment, the stabilizer may include at least one of poloxamer, polyvinyl alcohol (PVA), hydroxypropyl methylcellulose (HPMC), polyvinylpyrrolidone (PVP), sodium lauryl sulfate (SLS), cholic acid, and deoxycholic acid. In an exemplary embodiment, exemplary curcumin nanococrystal composition comprises the stabilizer with a concentration between about 50% and about 90% of weight of the curcumin nanococrystal composition. In an exemplary embodiment, exemplary curcumin nanococrystal composition may be administered to a patient through at least one of intravenous injection, intranasal administration, inhalation administration, buccal administration, sublingual administration, topical administration, and oral administration.

In an exemplary embodiment, exemplary curcumin nanococrystal composition may further include a lyoprotectant. In an exemplary embodiment, the lyoprotectant may include at least one of polyethylene glycol (PEG), trehalose, mannitol, and sucrose. In an exemplary embodiment, the lyoprotectant may have a concentration between about 20% and about 50% of weight of the curcumin nanococrystal composition. In an exemplary embodiment, the curcumin of an exemplary curcumin nanococrystal composition may have a water-solubility between about 5 mg/ml and about 20 mg/ml for at least 6 months at a temperature between about 5° C. and about 30° C.

In another general aspect, the present disclosure describes an exemplary method for synthesizing curcumin nanococrystal composition. Exemplary method may include producing the curcumin nanococrystal composition with a particle size less than about 10 nm and with a water solubility of curcumin between about 5 mg/ml and about 20 mg/ml. In an exemplary embodiment, producing the curcumin nanococrystal composition may include forming a first solution by dissolving curcumin and a coformer in a first solvent and forming a curcumin nanococrystal dispersion by mixing the first solution with a second solution. In an exemplary embodiment, the second solution may include a stabilizer and a second solvent. In an exemplary embodiment, exemplary method may further include solidifying the curcumin nanococrystal dispersion by at least one of freeze-drying and spray-drying the curcumin nanococrystal dispersion.

In an exemplary embodiment, the coformer may include at least one of 3,5-dinitrobenzoicacid, gentisic acid, phloroglucinol, 4,4-bipyridine, tartaric acid, citric acid, and gallic acid. In an exemplary embodiment, the first solvent may include at least one of N-methyl-2-pyrrolidone, dichloromethane, dimethyl sulfoxide (DMSO), chloroform, acetone, tetrahydrofuran, and acetic acid. In an exemplary embodiment, dissolving the curcumin and the coformer in the first solvent may include dissolving the curcumin and the coformer in the first solvent with a weight ratio of the curcumin to the coformer between about 0.15 and about 1.5. In an exemplary embodiment, the first solution may include the curcumin with a concentration between about 30 mg/ml and about 80 mg/m. In an exemplary embodiment, the first solution may include the coformer with a concentration between about 15 mg/ml and about 44 mg/ml.

In an exemplary embodiment, the second solvent may include at least one of water and low-molecular-weight liquid polyethylene glycol (PEG). In an exemplary embodiment, the second solution may include the stabilizer with a concentration between about 1% w/v and about 15% w/v. In an exemplary embodiment, the stabilizer may include at least one of poloxamer, polyvinyl alcohol (PVA), hydroxypropyl methylcellulose (HPMC), polyvinylpyrrolidone (PVP), sodium lauryl sulfate (SLS), cholic acid, and deoxycholic acid. In an exemplary embodiment, mixing the first solution with the second solution may include at least one of stirring, high-shear mixing, and sonicating the first solution with the second solution. In an exemplary embodiment, mixing the first solution with the second solution may include mixing the first solution with the second solution with a ratio of the second solvent to the first solvent between about 5 (v/v) and about 10 (v/v).

In an exemplary embodiment, freeze-drying the curcumin nanococrystal dispersion comprises conducting fast freeze-drying or slow freeze-drying. In an exemplary embodiment, conducting fast freeze-drying may include placing the curcumin nanococrystal dispersion in liquid nitrogen. In an exemplary embodiment, conducting slow freeze-drying may include placing the curcumin nanococrystal dispersion at a temperature between about −40° C. and about −80° C. for a time period between about 12 hours and about 24 hours. In an exemplary embodiment, freeze-drying the curcumin nanococrystal dispersion may include freeze-drying the curcumin nanococrystal dispersion by adding a lyoprotectant to the curcumin nanococrystal dispersion, the lyoprotectant comprising at least one of polyethylene glycol (PEG), trehalose, mannitol, and sucrose.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1A:
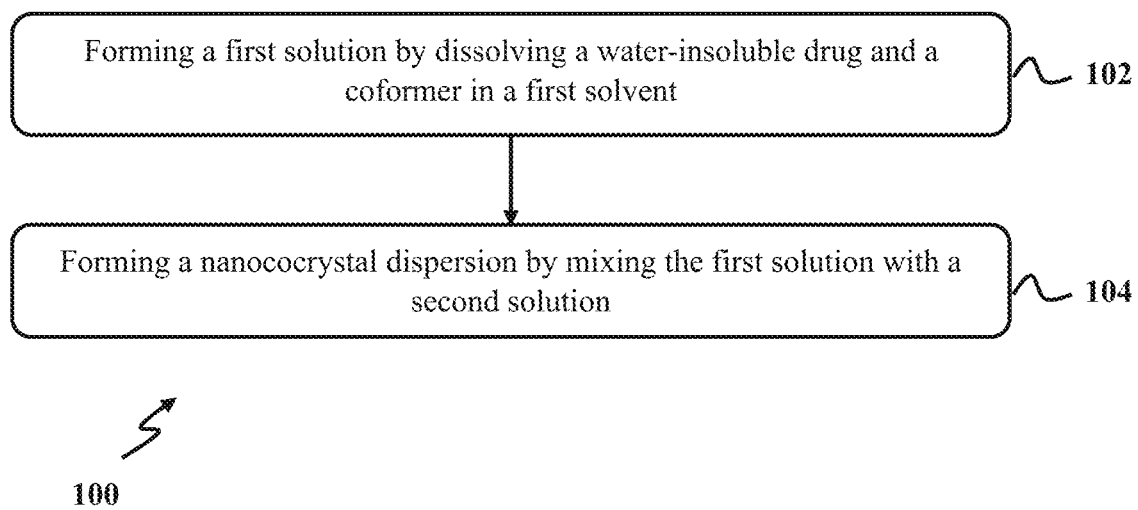
FIG. 1A illustrates an exemplary flowchart of an exemplary method for synthesizing an exemplary nanococrystal composition of a water-insoluble drug, consistent with one or more exemplary embodiments of the present disclosure.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The following detailed description is presented to enable a person skilled in the art to make and use the methods and devices disclosed in exemplary embodiments of the present disclosure. For purposes of explanation, specific nomenclature is set forth to provide a thorough understanding of the present disclosure. However, it will be apparent to one skilled in the art that these specific details are not required to practice the disclosed exemplary embodiments. Descriptions of specific exemplary embodiments are provided only as representative examples. Various modifications to the exemplary implementations will be readily apparent to one skilled in the art, and the general principles defined herein may be applied to other implementations and applications without departing from the scope of the present disclosure. The present disclosure is not intended to be limited to the implementations shown but is to be accorded the widest possible scope consistent with the principles and features disclosed herein.

The present disclosure generally describes an exemplary nanococrystal composition for water-insoluble compounds, such as carvedilol and curcumin, to increase their hydrophilicity. Exemplary nanococrystal composition may include nanosized cocrystals and benefits from both cocrystal and nanocrystal technologies to solve the problem of water-insoluble drugs. Exemplary nanococrystal composition may enhance oral bioavailability and solubility of water-insoluble drugs for manufacturing safe injectable formulations. In an exemplary embodiment, exemplary nanococrystal composition of carvedilol may increase water solubility of the carvedilol for at least 1500 times compared to pure carvedilol. In an exemplary embodiment, exemplary nanococrystal composition of curcumin may increase water solubility of curcumin for at least 16000 times compared to pure curcumin. In an exemplary embodiment, exemplary nanococrystal composition may have a particle size of less than 1 nm, making exemplary nanococrystal composition soluble and suitable for intravenous administration.

Exemplary nanococrystal composition may include a water-insoluble compound, a coformer, and a stabilizer. In an exemplary embodiment, the water-insoluble compound may include carvedilol, curcumin, aprepitant, spironolactone, docetaxel, paclitaxel, sorafenib, camptothecin, SN38, oxaliplatin, cisplatin, irinotecan, fluorouracil (5-FU), cyclophosphamide, propofol, ciclosporin, clofibrate, meloxicam, rosuvastatin, everolimus, sirolimus, and tacrolimus. In an exemplary embodiment, the coformer may include at least one of 3,5-dinitrobenzoicacid, gentisic acid, phloroglucinol, 4,4-bipyridine, tartaric acid, citric acid, and gallic acid. In the present disclosure, a "water-insoluble drug" may refer to practically water-insoluble drug with a solubility less than 0.1 mg/ml. In the present disclosure, "coformer" may refer to a compound that forms metastable crystals with drugs to reduce the free energy of complexation. In the present disclosure, "nanococrystal" may refer to nanosized solids with a particle size less than 10 nm that are crystalline single-phase materials composed of two or more different molecular or ionic compounds generally in a stoichiometric ratio which are neither solvates nor simple salts. In an exemplary embodiment, nanococrystal may have a particle size up to 1 nm.

In an exemplary embodiment, exemplary nanococrystal composition may be an exemplary carvedilol nanococrystal composition with a particle size less than about 5 nm. In an exemplary embodiment, exemplary carvedilol nanococrystal composition may have ultrafine particles with a particle size less than about 1 nm. In an exemplary embodiment, the carvedilol in exemplary carvedilol nanococrystal composition may have a water-solubility between about 2 mg/ml and about 10 mg/ml. In an exemplary embodiment, the carvedilol of a freeze-dried nanococrystal composition form may have a water-solubility between 2 mg/ml and 10 mg/ml for at least 18 months at a temperature between about 5° C. and about 30° C.

In an exemplary embodiment, exemplary carvedilol nanococrystal composition may include the carvedilol with a concentration between about 5% and about 75% of weight of the carvedilol nanococrystal composition. In an exemplary embodiment, exemplary carvedilol nanococrystal composition may include the coformer with a concentration between about 2% and about 30% of weight of the carvedilol nanococrystal composition. In an exemplary embodiment, exemplary carvedilol nanococrystal composition may include the stabilizer with a concentration between about 35% and about 90% of weight of the carvedilol nanococrystal composition. In an exemplary embodiment, exemplary carvedilol nanococrystal composition may include the lyoprotectant with a concentration between about 1% and about 95% of weight of the carvedilol nanococrystal composition.

In an exemplary embodiment, exemplary carvedilol nanococrystal composition may have a powder X-ray diffraction pattern with characteristic peaks expressed in 2-theta degrees at positions of about 19.3 and about 23.4. Furthermore, in an exemplary embodiment, exemplary carvedilol nanococrystal composition may have a (differential scanning calorimetry) DSC thermogram with an endothermic peak at a temperature between about 60° C. and about 63° C.

In an exemplary embodiment, exemplary curcumin nanococrystal composition may have a particle size less than about 10 nm. In an exemplary embodiment, exemplary nanococrystal composition may be an exemplary curcumin nanococrystal with a particle size less than about 1 nm. In an exemplary embodiment, curcumin may have a water-solubility between about 5 mg/ml and about 20 mg/ml. In an exemplary embodiment, exemplary curcumin nanococrystal composition may include the curcumin and the coformer with a weight ratio of the curcumin to the coformer between about 0.15 and about 1.5. In an exemplary embodiment, exemplary curcumin nanococrystal composition may include the curcumin with a concentration between about 5% and about 70% of weight of the curcumin nanococrystal composition.

In an exemplary embodiment, exemplary curcumin nanococrystal composition comprises the coformer with a concentration between about 3% and about 35% of weight of the curcumin nanococrystal composition. In an exemplary embodiment, exemplary curcumin nanococrystal composition comprises the stabilizer with a concentration between about 50% and about 90% of weight of the curcumin nanococrystal composition. In an exemplary embodiment, the curcumin may have a water-solubility between about 5 mg/ml and about 20 mg/ml for at least 6 months at a temperature between about 5° C. and about 30° C.

In an exemplary embodiment, exemplary curcumin nanococrystal composition may further include a lyoprotectant. In an exemplary embodiment, the lyoprotectant may include at least one of polyethylene glycol (PEG), trehalose, mannitol, and sucrose. In an exemplary embodiment, the lyoprotectant may have a concentration between about 20% and about 50% of weight of the curcumin nanococrystal composition. In an exemplary embodiment, exemplary nanococrystal composition may be an exemplary aprepitant nanococrystal composition with a particle size of about 1 nm.

FIG. 1A illustrates an exemplary method 100 for synthesizing exemplary nanococrystal composition of water-insoluble drugs, consistent with one or more exemplary embodiments of the present disclosure. Exemplary method 100 may include forming a first solution by dissolving a water-insoluble drug and a coformer in a first solvent (step 102) and forming a nanococrystal dispersion by mixing the first solution with a second solution (step 104). In an exemplary embodiment, exemplary nanococrystal composition may be synthesized using at least one of solvent-diffusion and solvent-evaporation nanoprecipitation techniques.

In further detail with respect to step 102, in an exemplary embodiment, forming a first solution may include dissolving a water-insoluble drug and a coformer in a first solvent. In an exemplary embodiment, dissolving the water-insoluble drug and the coformer in the first solvent may include dissolving the water-insoluble drug and the coformer in the first solvent by low-speed stirring at speed between about 100 RPM and 200 RPM for a time period between about 1 and about 10 minutes at room temperature.

In an exemplary embodiment, the water-insoluble drug may include at least one of carvedilol, curcumin, aprepitant, spironolactone, docetaxel, paclitaxel, sorafenib, camptothecin, SN38, oxaliplatin, cisplatin, irinotecan, fluorouracil (5-FU), cyclophosphamide, propofol, ciclosporin, clofibrate, meloxicam, rosuvastatin, everolimus, sirolimus, and tacrolimus. In an exemplary embodiment, the coformer may include at least one of 3,5-dinitrobenzoiacid, gentisic acid, phloroglucinol, 4,4-bipyridine, tartaric acid, citric acid, and gallic acid. In an exemplary embodiment, the first solvent may include at least one of N-methyl-2-pyrrolidone, dichloromethane, dimethyl sulfoxide.

In an exemplary embodiment, dissolving the carvedilol and the coformer in the first solvent may include dissolving the carvedilol and the coformer in the first solvent with a weight ratio of the carvedilol to the coformer between about 0.4 and about 8. In an exemplary embodiment, the first solution may include carvedilol with a concentration between about 5 mg/ml and about 20 mg/ml to synthesize exemplary carvedilol nanococrystal composition. In an exemplary embodiment, the first solution may include the coformer with a concentration between about 3 mg/ml and about 10 mg/ml to synthesize exemplary carvedilol nanococrystal composition.

In an exemplary embodiment, dissolving the curcumin and the coformer in the first solvent may include dissolving the curcumin and the coformer in the first solvent with a weight ratio of the curcumin to the coformer between about 0.15 and about 1.5. In an exemplary embodiment, the first solution may include curcumin with a concentration between about 30 mg/ml and about 80 mg/ml to synthesize exemplary curcumin nanococrystal composition. In an exemplary embodiment, the first solution may include the coformer with a concentration between about 15 mg/ml and about 40 mg/ml to synthesize exemplary curcumin nanococrystal composition.

In further detail with respect to step 104, in an exemplary embodiment, forming a nanococrystal dispersion may include mixing the first solution with a second solution. In an exemplary embodiment, mixing the first solution with the second solution may include mixing the first solution with the second solution with a volume ratio of the first solution to the second solution between about 1:5 and about 1:15. In an exemplary embodiment, mixing the first solution with the second solution may include mixing the first solution with the second solution through at least one of stirring, high-shear mixing, and sonicating the first solution with the second solution. In an exemplary embodiment, mixing the first solution with the second solution may include mixing the first solution with the second solution with a ratio of the second solvent to the first solvent between about 5 (v/v) and about 10 (v/v). In an exemplary embodiment, the ratio of the second solvent to the first solvent may be about 7.5 (v/v).

In an exemplary embodiment, stirring the first solution with the second solution may include stirring the first solution with the second solution with a speed between 500 RPM and 1500 RPM for a time period between 2 hours and 6 hours using a magnet stirrer. In an exemplary embodiment, high-shear mixing may include high-shear mixing using a high-shear rotor-stator homogenizer at speed between about 5000 RPM to 15000 RPM for a time period between 10 minutes and about 60 minutes. In an exemplary embodiment, sonicating the first solution with the second solution may include sonicating the first solution with the second solution with a sonication power between about 100 W and 400 W for a time period between 10 minutes and 60 minutes.

In an exemplary embodiment, the nanococrystal dispersion may include the first solvent and the second solvent with a volume ratio of the first solvent and the second solvent between about 5 and about 15. In an exemplary embodiment, the second solution may include a stabilizer and a second solvent. In an exemplary embodiment, the second solvent may include at least one of water and low-molecular-weight liquid polyethylene glycol (PEG). In an exemplary embodiment, the low-molecular-weight liquid PEG may include at least one of PEG 200, PEG 400, and PEG 600.

In an exemplary embodiment, the second solution may include the stabilizer with a concentration between about 0.25% w/v and about 1% w/v for the synthesis of exemplary carvedilol nanococrystal composition. In an exemplary embodiment, the second solution may include the stabilizer with a concentration between about 1% w/v and about 15% w/v to synthesize exemplary curcumin nanococrystal composition. In an exemplary embodiment, the stabilizer may include at least one of poloxamer, polyvinyl alcohol (PVA), hydroxypropyl methylcellulose (HPMC), polyvinylpyrrolidone (PVP), sodium lauryl sulfate (SLS), cholic acid, and deoxycholic acid. In an exemplary embodiment, the poloxamer may include at least one of poloxamer 407, poloxamer 188, and poloxamer 123.

In an exemplary embodiment, exemplary nanococrystal composition may be formulated in a solid form, such as a freeze-dried (lyophilized) form, a spray-dried form, and a vacuum-dried form. In an exemplary embodiment, exemplary nanococrystal composition may be formulated as a concentrated (water-free) liquid formulation.

Figure 1B:
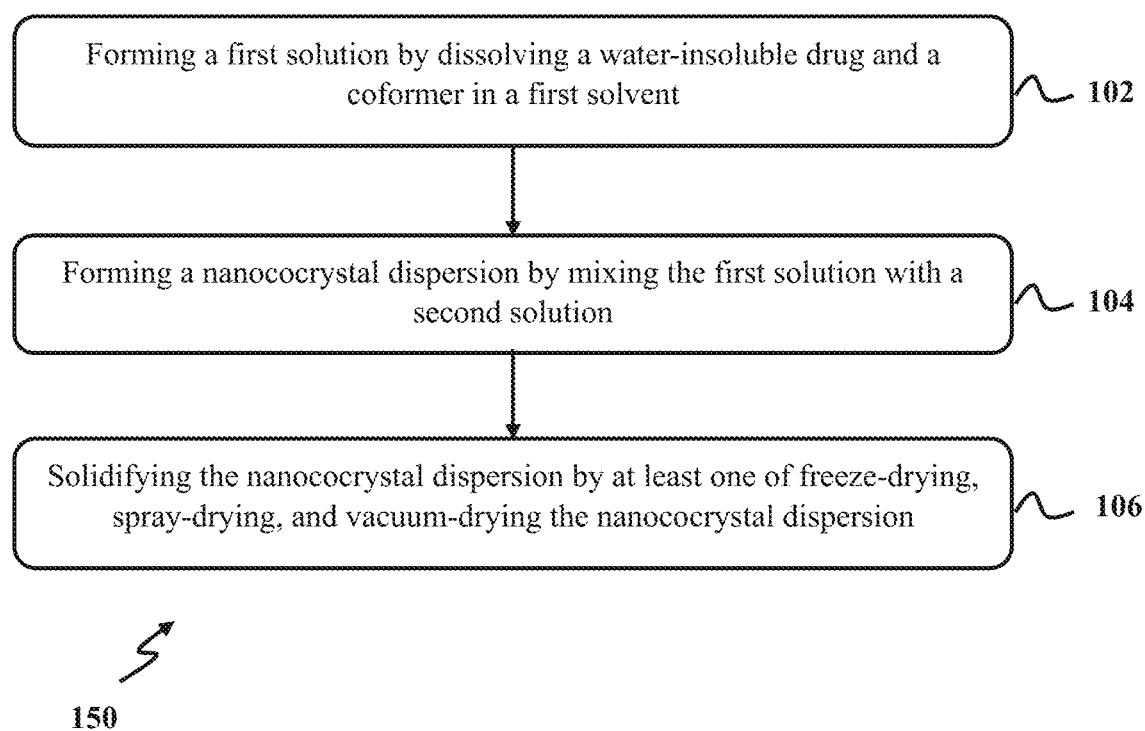
FIG. 1B illustrates an exemplary implementation of an exemplary method for synthesizing an exemplary nanococrystal composition of a water-insoluble drug, consistent with one or more exemplary embodiments of the present disclosure.

In an exemplary implementation, exemplary method 150 may further include solidifying the nanococrystal dispersion. FIG. 1B illustrates an exemplary implementation of exemplary method 150 for synthesizing an exemplary nanococrystal composition of a water-insoluble drug, consistent with one or more exemplary embodiments of the present disclosure. Referring to FIG. 1B, exemplary method 150 may include forming a first solution by dissolving a water-insoluble drug and a coformer in a first solvent (step 102), forming a nanococrystal dispersion by mixing the first solution with a second solution (step 104), and solidifying the nanococrystal dispersion by at least one of freeze-drying, spray-drying, and vacuum-drying the nanococrystal dispersion (step 106).

Accordingly, in addition to steps 102 and 104 of method 100, method 150 may contain additional step 106. In further detail with respect to step 106, in an exemplary embodiment, solidifying the nanococrystal dispersion may include solidifying the carvedilol nanococrystal dispersion by at least one of freeze-drying, spray-drying, and vacuum-drying the carvedilol nanococrystal dispersion. In an exemplary embodiment, freeze-drying the carvedilol nanococrystal dispersion may include conducting fast freeze-drying or slow freeze-drying. In an exemplary embodiment, conducting fast freeze-drying may include placing the carvedilol nanococrystal dispersion in liquid nitrogen. In an exemplary embodiment, conducting slow freeze-drying may include placing the carvedilol nanococrystal dispersion at a temperature between about −40° C. and about −80° C. for a time period between about 12 hours and about 24 hours.

In an exemplary embodiment, freeze-drying the nanococrystal dispersion may include freeze-drying the carvedilol nanococrystal dispersion by adding a lyoprotectant to the carvedilol nanococrystal dispersion. In an exemplary embodiment, the lyoprotectant may include at least one of PEG, trehalose, mannitol, and sucrose. In an exemplary embodiment, the lyoprotectant may include PEG 4000. In an exemplary embodiment, adding the lyoprotectant to the carvedilol nanococrystal dispersion may include adding the lyoprotectant with a concentration between about 1% w/v and about 10% w/v to the carvedilol nanococrystal dispersion.

In an exemplary embodiment, exemplary nanococrystal composition may be administered to a patient through at least one of intravenous injection, intranasal administration, inhalation administration, buccal administration, sublingual administration, topical administration, and oral administration. In an exemplary embodiment, exemplary carvedilol nanococrystal formulation may be used for treating hypertension (HTN), congestive heart failure (CHF), left ventricular dysfunction following myocardial infarction, and angina pectoris with an administration dose between about 3.125 mg and about 50 mg twice daily. In an exemplary embodiment, exemplary curcumin nanococrystal formulation may be used to treat osteoarthritis, dyspepsia, hepatitis, cancers, and cardiovascular disease with an administration dose of about 30 mg once a day and about 500 mg three times a day.

EXAMPLES

Example 1: Synthesis of Exemplary Carvedilol Nanococrystal Composition

In this example, exemplary carvedilol nanococrystal composition was synthesized utilizing a process similar to exemplary method 100 presented in FIG. 1A. Exemplary carvedilol nanococrystal composition was synthesized using tartaric acid (TA) as a coformer, poloxamer 188 (PLX) as a stabilizer, acetone as a first solvent, and water as a second solvent (anti-solvent). TA was preferred among selected coformers due to its safety, availability, cheapness, and long history of use in oral and parenteral preparations. Poloxamer 188 (PLX) was also preferred as the stabilizer because of its lowest toxicity, significantly smaller molecular size, high biocompatibility, and having approval for oral and parenteral applications. Finally, among the first solvents, acetone was preferred because of its lowest toxicity and higher biocompatibility while having the required solubilizing capabilities.

In this example, the ultrasonic/stirring nanoprecipitation technique was chosen for synthesizing exemplary carvedilol nanococrystal composition due to its capabilities, simpleness, availability, and lack of need for expensive equipment like high-pressure homogenizers, ball milling, or wet grinders. TABLE 1 represents different formulations of an exemplary carvedilol nanococrystal composition. Initially, a first solution was formed by dissolving carvedilol (CAR) and tartaric acid in acetone. Also, a second solution was formed by dissolving poloxamer 188 in water. Finally, the volume ratio of the water (anti-solvent or second solvent) to acetone (first solvent) was determined as solvent ratio (SR).

In the next step, a carvedilol nanococrystal dispersion was formed by dropwise addition of the first solution to the second solution and mixing using a probe sonicator at a constant power of about 400 W for a time period of about 5 minutes. After 5 minutes, the sonication was stopped, and the carvedilol nanococrystal dispersion was stirred for 4 hours to remove acetone.

TABLE 1

Different formulations of an exemplary carvedilol nanococrystal composition.

| Formulation Number | CAR (mg/ml) | TA (mg/ml) | SR (v/v) | PLX (% w/v) | PS (nm) |
| --- | --- | --- | --- | --- | --- |
| 1 | 10 | 3.125 | 7.5 | 0.25 | 213 |
| 2 | 20 | 3.125 | 7.5 | 0.25 | 24.9 |
| 3 | 10 | 9.375 | 7.5 | 0.25 | 298.3 |

TABLE 1-continued

Different formulations of an exemplary carvedilol nanococrystal composition.

| Formulation Number | CAR (mg/ml) | TA (mg/ml) | SR (v/v) | PLX (% w/v) | PS (nm) |
|---|---|---|---|---|---|
| 4 | 20 | 9.375 | 7.5 | 0.25 | 2840 |
| 5 | 10 | 3.125 | 12.5 | 0.25 | 1006 |
| 6 | 20 | 3.125 | 12.5 | 0.25 | 919 |
| 7 | 10 | 9.375 | 12.5 | 0.25 | 610 |
| 8 | 20 | 9.375 | 12.5 | 0.25 | 498 |
| 9 | 10 | 3.125 | 7.5 | 0.75. | 0.98 |
| 10 | 20 | 3.125 | 7.5 | 0.75 | 2311 |
| 11 | 10 | 9.375 | 7.5 | 0.75 | 442 |
| 12 | 20 | 9.375 | 7.5 | 0.75 | 1100 |
| 13 | 10 | 3.125 | 12.5 | 0.75 | 408 |
| 14 | 20 | 3.125 | 12.5 | 0.75 | 1051 |
| 15 | 10 | 9.375 | 12.5 | 0.75 | 907 |
| 16 | 20 | 9.375 | 12.5 | 0.75 | 1604 |
| 17 | 5 | 6.25 | 10 | 0.5 | 4.59 |
| 18 | 25 | 6.25 | 10 | 0.5 | 2058 |
| 19 | 15 | 0 | 10 | 0.5 | 1579 |
| 20 | 15 | 12.5 | 10 | 0.5 | 1507 |
| 21 | 15 | 6.25 | 5 | 0.5 | 2199 |
| 22 | 15 | 6.25 | 15 | 0.5 | 1570 |
| 23 | 15 | 6.25 | 10 | 0 | 1000 |
| 24 | 15 | 6.25 | 10 | 1 | 3120 |
| 25 | 15 | 6.25 | 10 | 0.5 | 1825 |
| 26 | 15 | 6.25 | 10 | 0.5 | 1802 |
| 27 | 15 | 6.25 | 10 | 0.5 | 1815 |
| 28 | 15 | 6.25 | 10 | 0.5 | 1830 |
| 29 | 15 | 6.25 | 10 | 0.5 | 1820 |
| 30 | 15 | 6.25 | 10 | 0.5 | 1815 |

In this example, the particle size of exemplary carvedilol nanococrystal composition was examined using dynamic light scattering (DLS). Referring to TABLE 1, formulations 9 and 17 showed the smallest particle size of exemplary carvedilol nanococrystal composition. It is expected that with decreasing particle size (PS), oral availability increases significantly due to higher surface area. Furthermore, particles smaller than 1 nm are practically considered as a solution making their intravenous injection possible.

Figure 2A:
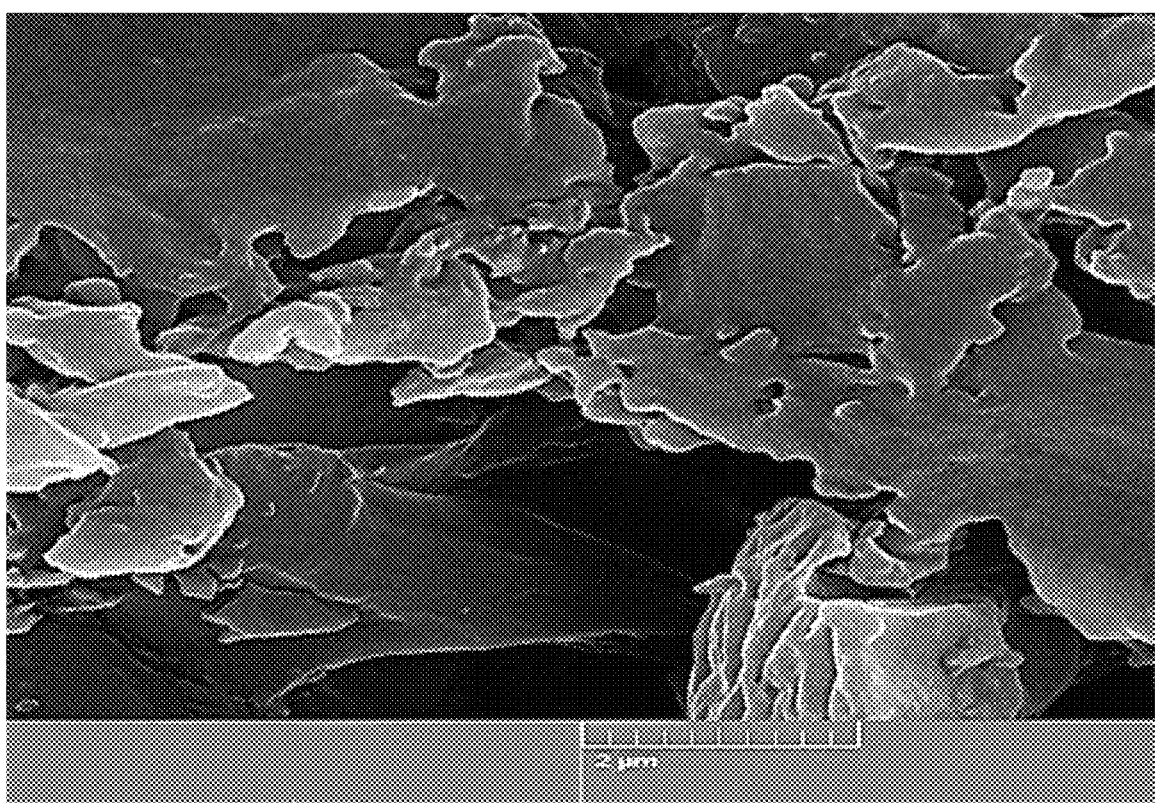
FIG. 2A illustrates a scanning electron microscopy (SEM) image of an exemplary carvedilol nanococrystal, consistent with one or more exemplary embodiments of the present disclosure.
Figure 2B:
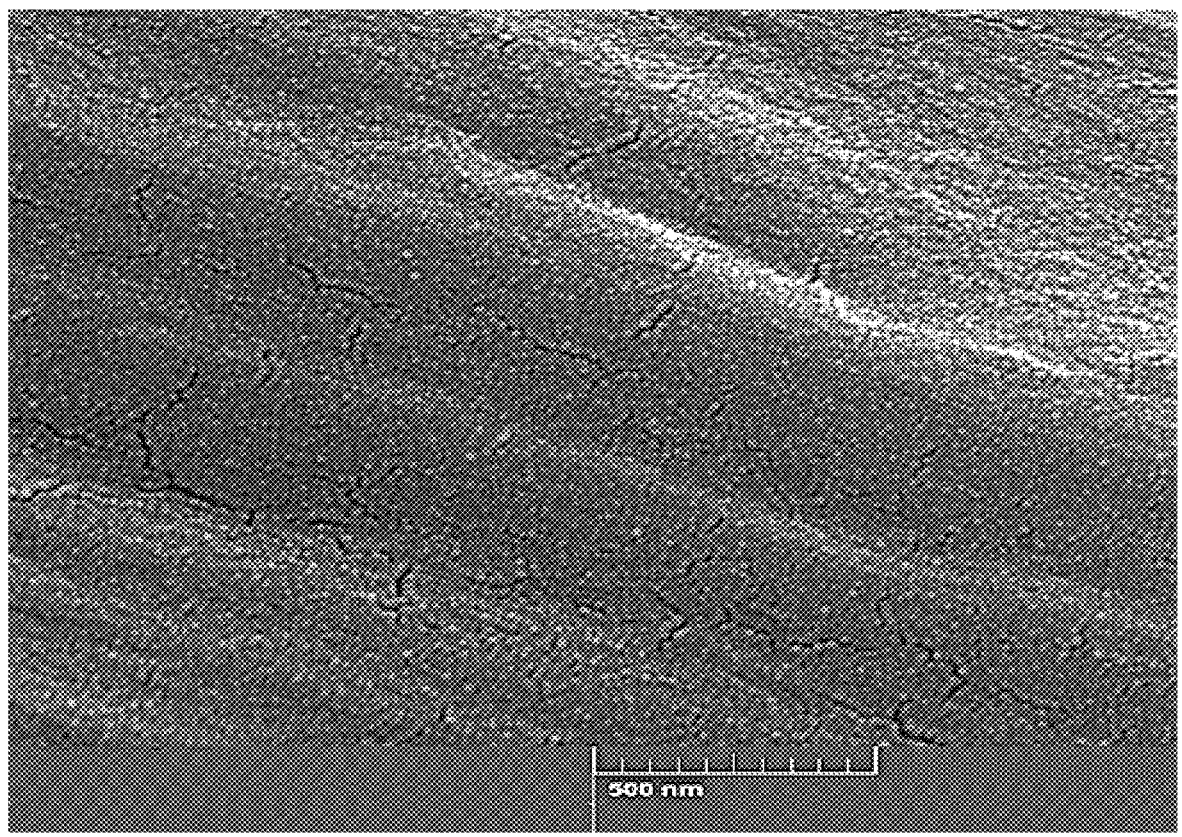
FIG. 2B illustrates a magnified SEM image of an exemplary carvedilol nanococrystal, consistent with one or more exemplary embodiments of the present disclosure.

Also, the morphology of exemplary carvedilol nanococrystal composition was examined using scanning electron microscopy (SEM). FIG. 2A illustrates an SEM image of an exemplary carvedilol nanococrystal, consistent with one or more exemplary embodiments of the present disclosure. FIG. 2B illustrates a magnified SEM image of an exemplary carvedilol nanococrystal, consistent with one or more exemplary embodiments of the present disclosure. Referring to FIGS. 2A-2B, exemplary carvedilol nanococrystal composition revealed ultra-fine spherical nanoparticles arranged beside each other constituting a homogenous, monolithic structure.

Example 2: Lyophilization of an Exemplary Carvedilol Nanococrystal Composition

While carvedilol is chemically unstable in aqueous media for the long term, making its liquid formulation impossible. Freeze drying is the most common way to stabilize chemically unstable drug compounds. However, the most challenging problem in the freeze-drying of nanoparticles is the possibility of the nanoparticles aggregation, which increases the particle size (PS). Hence, in this example, different lyoprotectants, such as PEG 4000, mannitol, trehalose, and sucrose, and various freezing rates were examined for two formulations of exemplary carvedilol nanococrystal composition to achieve suitable freeze-drying conditions without any change in the PS (TABLE 2). Exemplary carvedilol nanococrystal composition was lyophilized by fast freeze-drying using liquid nitrogen or by slow freeze-drying at a temperature of about −80° C. for 24 hours.

TABLE 2

Effect of freeze-drying conditions on the particle size of an exemplary carvedilol nanococrystal composition of TABLE 1.

| Formulation number | Lyoprotectants | % w/v | Particle size (nm) ± SD Before freeze-drying | After freeze-drying |
|---|---|---|---|---|
| Fast freeze-drying | | | | |
| 9 | None | | 0.970 | 2521 ± 6.6 |
| 9 | Mannitol | 1% | 0.970 | 1663 ± 7.2 |
| 9 | Sucrose | 1% | 0.970 | 1311 ± 3.7 |
| 9 | Trehalose | 1% | 0.970 | 1230 ± 3.7 |
| 9 | PEG | 1% | 0.970 | 980 ± 3.5 |
| 9 | Mannitol | 5% | 0.970 | 732 ± 3.2 |
| 9 | Sucrose | 5% | 0.970 | 987 ± 5.4 |
| 9 | Trehalose | 5% | 0.970 | 690 ± 5.5 |
| 9 | PEG | 5% | 0.970 | 2.200 ± 2 |
| 17 | PEG | 5% | 4.59 | 0.940 |
| Slowt freeze-drying | | | | |
| 9 | Trehalose | 5% | 0.970 | 0.980 ± 0.1 |
| 9 | PEG | 5% | 0.970 | 0.970 ± 0.2 |
| 9 | Trehalose | 10% | 0.970 | 0.920 ± 0.1 |
| 9 | Trehalose + PEG | 2.5% + 2.5% | 0.970 | 0.960 ± 0.1 |
| 9 | Trehalose + PEG | 5% + 5% | 0.970 | 0.960 ± 0.1 |
| 17 | PEG | 5% | 4.59 | 0.990 ± 0.2 |
| 17 | Trehalose | 5% | 4.59 | 0.980 ± 0.3 |
| 17 | Trehalose | 10% | 4.59 | 0.970 ± 0.1 |
| 17 | Trehalose + PEG | 2.5% + 2.5% | 4.59 | 0.960 ± 0.2 |
| 17 | Trehalose + PEG | 5% + 5% | 4.59 | 0.960 ± 0.2 |

Figure 3A:
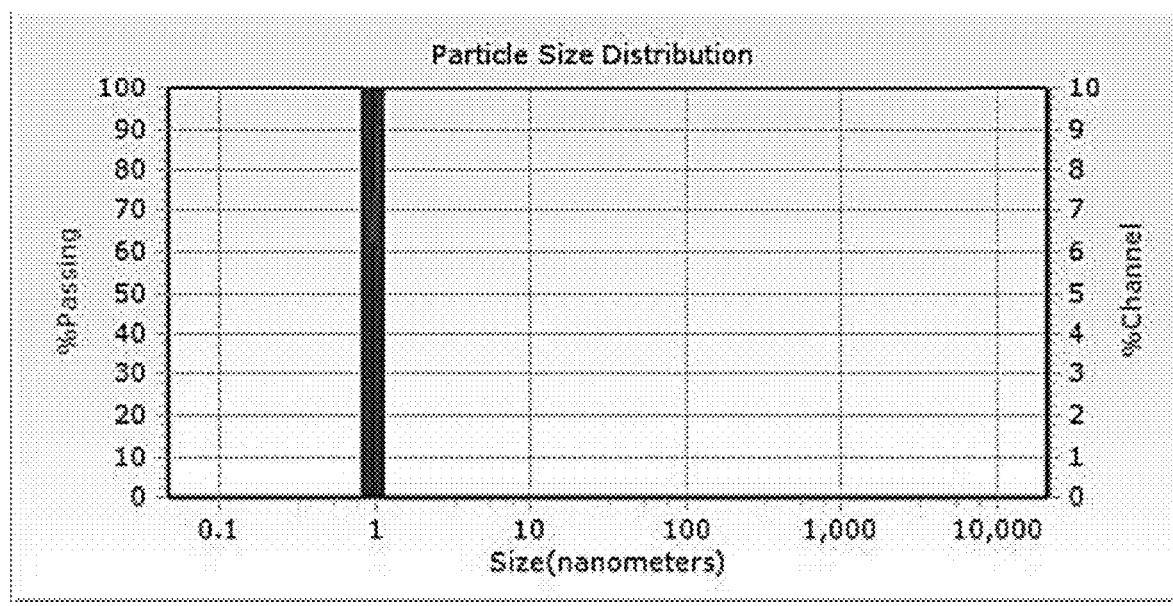
FIG. 3A illustrates a particle size distribution of an exemplary carvedilol nanococrystal before freeze-drying using dynamic light scattering (DLS), consistent with one or more exemplary embodiments of the present disclosure.

FIG. 3A and FIG. 38 show a PS distribution of formulation 9 of TABLE 1 for an exemplary carvedilol nanococrystal before and after slow freeze-drying with PEG, respectively. FIG. 3A illustrates a PS distribution of formulation 9 of TABLE 1 for an exemplary carvedilol nanococrystal before freeze-drying using DLS, consistent with one or more exemplary embodiments of the present disclosure. FIG. 38 illustrates a PS distribution of formulation 9 of TABLE 2 for an exemplary carvedilol nanococrystal after slow freeze-drying using DLS, consistent with one or more exemplary embodiments of the present disclosure.

Figure 3B:
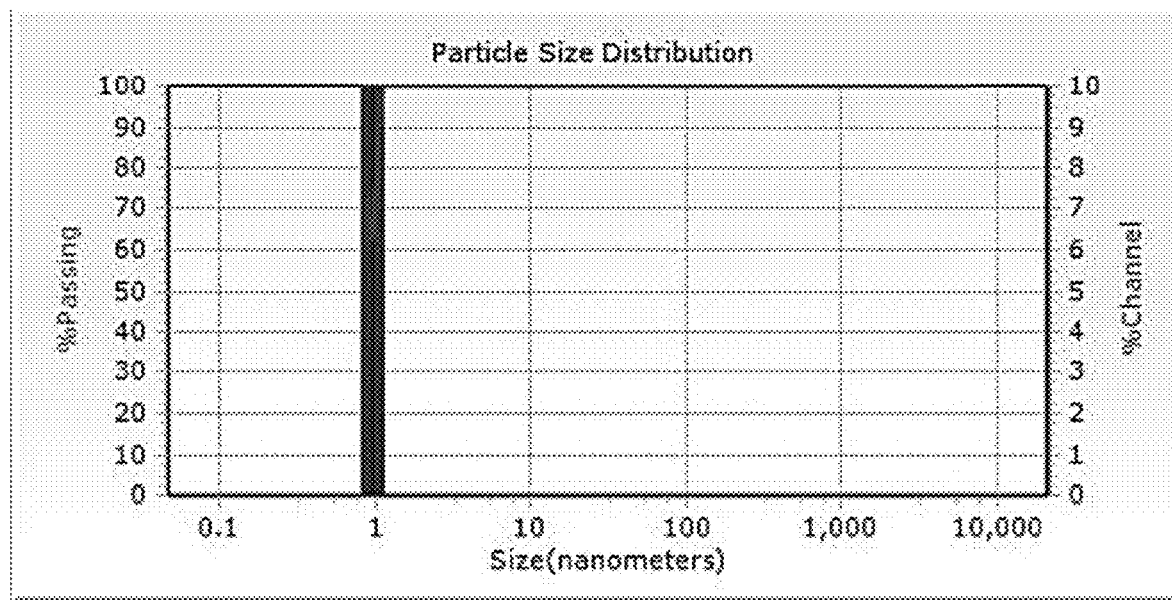
FIG. 3B illustrates a particle size distribution of an exemplary carvedilol nanococrystal after freeze-drying using DLS, consistent with one or more exemplary embodiments of the present disclosure.

Referring to TABLE 2 and FIGS. 3A-3B, with selecting proper lyoprotectant, its concentration, and freezing rate, the lyophilization of carvedilol nanocrystals could produce ultrafine spherical nanoparticles with PS less than 1 nm making the intravenous injection of formulation possible. Also, while only a high concentration (5% w/v) of PEG 4000 can produce the initial small PS after fast freeze-drying, PEG 4000 or trehalose and their combination can reproduce initial PSs in slow freeze-drying. Therefore, the formulations containing less lyoprotectant are preferred because of the lower possibility of adverse effects in intravenous administration.

Example 3: Synthesis of an Exemplary Curcumin Nanococrystal Composition

In this example, exemplary curcumin nanococrystal composition was synthesized utilizing a process similar to exemplary method 100 presented in FIG. 1A. Initially, a first solution was formed by dissolving curcumin with a concentration of about 80 mg/ml and tartaric acid with a concentration of about 40 mg/ml in acetone. Also, a second solution was formed by dissolving 4% w/v polyvinylpyrrolidone 25 (PVP25) and 0.5% w/v sodium lauryl sulfate (SLS) in water. Also, the ratio of water (second solvent) to acetone (first solvent)(SR) was about 7.5.

In the next step, a curcumin nanococrystal dispersion was formed by dropwise addition of the first solution to the second solution and stirring using a probe sonicator at a constant power of about 400 for a time period of about 5 minutes. After 5 minutes, the sonication was stopped, and the curcumin nanococrystal dispersion was stirred with a speed of about 400 RPM for 5 hours to evaporate acetone. In the end, the curcumin nanococrystal dispersion was freeze-dried using a slow freeze-drying technique by adding PEG4000 with a concentration of about 5% w/v as the lyoprotectant to the curcumin nanococrystal dispersion at a temperature of about −70° C. for a time period of about 24 hours.

TABLE 3

Different formulations of an exmplary curcumin nanococrystal composition.

| Formulation number | CUR (mg/ml) | TA (mg/ml) | SLS (% w/v) | PVP (% w/v) | PS (nm) |
|---|---|---|---|---|---|
| 1 | 40 | 20 | 2 | 4 | 2052 |
| 2 | 40 | 20 | 1 | 2 | 1.7 |
| 3 | 40 | 20 | 0.5 | 1 | 1389 |
| 4 | 40 | 20 | 0.5 | 0.5 | aggregate |
| 5 | 40 | 20 | 0 | 1 | aggregate |
| 6 | 40 | 20 | 0 | 2 | aggregate |
| 7 | 80 | 40 | 4 | 8 | 2389 |
| 8 | 80 | 40 | 2 | 4 | 1.7 |
| 9 | 80 | 40 | 2 | | 2.1 |
| 10 | 80 | 40 | 1 | 4 | 1.7 |
| 11 | 80 | 40 | 0.5 | 4 | 1.7 |
| 12 | 80 | 40 | 0 | 6 | aggregate |
| 13 | 80 | 40 | 0 | 8 | aggregate |
| 14 | 80 | 40 | 0 | 10.6 | aggregate |
| 15 | 80 | 40 | 0 | 13.3 | aggregate |
| 16 | 30 | 15 | 0 | 15 | aggregate |
| 17 | 30 | 15 | 0 | 0 | aggregate |
| 18 | 30 | 15 | 0 | 30 | 9 |
| 19 | 30 | 15 | 0 | 60 | 9 |
| 20 | 60 | 30 | 0 | 75 | 9 |

Referring to TABLE 3, formulations 2, 8, 10, 11, and 12 showed the smallest particle size of an exemplary curcumin nanococrystal composition, which is about 1.7 nm; as a result, these formulations are practically considered as a solution. Considering the highest amount of curcumin in formulation, lowest amount of SLS and PVP, formulation 11 is preferred. The PS of formulation 11 of an exemplary curcumin nanococrystal composition was examined before and after freeze-drying.

Figure 4A:
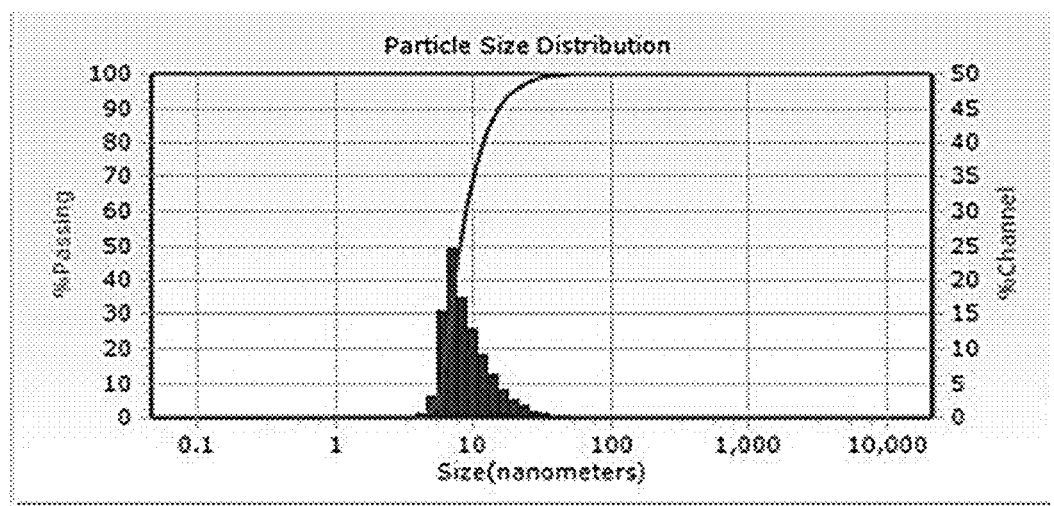
FIG. 4A illustrates a particle size distribution of an exemplary curcumin nanococrystal before freeze-drying using DLS, consistent with one or more exemplary embodiments of the present disclosure.
Figure 4B:
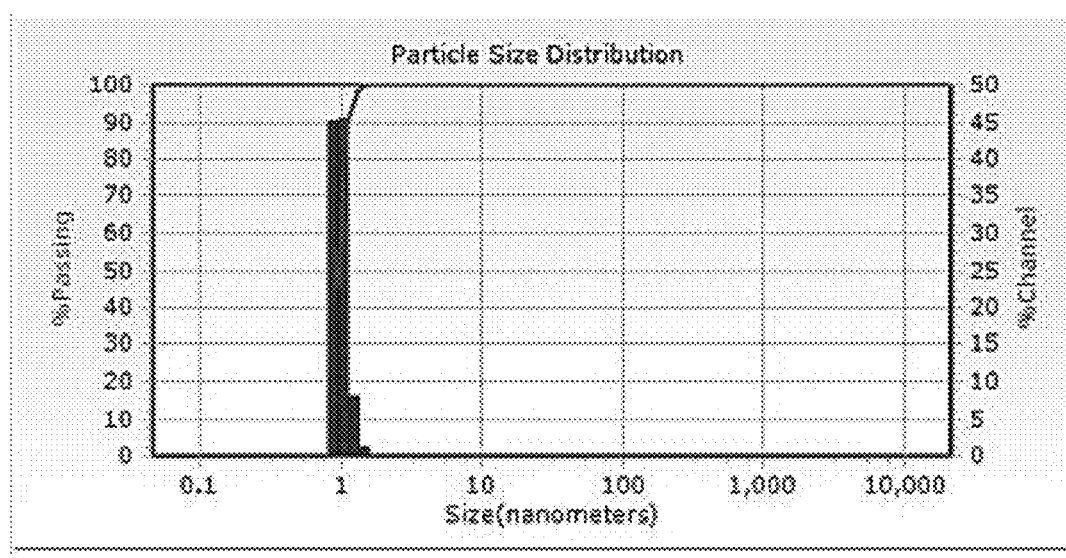
FIG. 4B illustrates a particle size distribution of an exemplary curcumin nanococrystal after freeze-drying using DLS, consistent with one or more exemplary embodiments of the present disclosure.

Also, effect of freeze-drying on the particle size of an exemplary curcumin nanococrystal composition was evaluated. FIG. 4A illustrates a PS distribution of formulation 11 of TABLE 3 for an exemplary curcumin nanococrystal before freeze-drying using DLS, consistent with one or more exemplary embodiments of the present disclosure. FIG. 4B illustrates a PS distribution of formulation 11 of TABLE 3 for exemplary curcumin nanocrystal after freeze-drying using DLS, consistent with one or more exemplary embodiments of the present disclosure.

TABLE 4

Effect of freeze-drying on the particle size of an exemplary curcumin nanococrystal composition of TABLE 3.

| Formulation number | PEG (% w/v) | Particle size (nm) ± SD | |
|---|---|---|---|
| | | Before freeze drying | After freeze drying |
| Formulation 11 | 0 | 1.7 | 2521 ± 6.6 |
| Formulation 11 | 2 | 1.7 | 1612 ± 5.2 |
| Formulation 11 | 2.6 | 1.7 | 0.98 ± 0.7 |
| Formulation 11 | 5 | 1.7 | 2.1 ± 3.7 |
| Formulation 11 | 6 | 1.7 | 0.96 ± 0.5 |

Referring to TABLE 4 and FIGS. 4A-4B, the slow freeze-drying with proper selection of lyoprotectant type and concentration can reduce the PS and PS distribution of curcumin nanococrystals, revealing a very sharp peak of scattered light around 1 nm. As a result, a fast and highly soluble form of drug for oral administration and also an intravenous injectable formulation could be achieved. Moreover, the solid nature of the formulation provides the product stability for long term storage.

Example 4: Water-Solubility of an Exemplary Carvedilol Nanococrystal Composition Carvedilol is a highly lipophilic, practically water-insoluble drug (4 µg/mL) and rapidly absorbed following oral administration. However, it has an absolute bioavailability of approximately 25% to 35% due to its low solubility and high first-pass metabolism. Following oral administration, the apparent mean terminal elimination half-life of carvedilol generally ranges from 7 hours to 10 hours. On the other hand, there is no safe injectable form of the drug for the rapid treatment of acute hypertension crises regarding its very low water solubility.

In this example, the water-solubility of different lyophilized forms of exemplary carvedilol nanocrystal composition was measured by UV spectroscopy for 18 months. TABLE 5 represents saturation solubility of carvedilol and different lyophilized forms of exemplary carvedilol nanocrystal composition within 18 months.

TABLE 5

Saturation solubility of pure carvedilol (CAR), a slow freeze-dried formulation containing PEG (SP), a slow freeze-dried formulation containing trehalose (ST), a fast freeze-dried formulation containing PEG (FP) of an exemplary cardilol nanocrystal composition.

| Time (month) | SP (mg/mL) | ±SD | ST (mg/ml) | ±SD | FP (mg/mL) | ±SD | CAR (mg/mL) | ±SD |
|---|---|---|---|---|---|---|---|---|
| 0 | 7.40 | 0 | 7.66 | 0.01 | 7.60 | 0.01 | 0.004 | 0.0001 |
| 1 | 7.05 | 0.02 | 6.04 | 0.06 | 3.14 | 0.03 | 0.006 | 0.0016 |
| 2 | 6.98 | 0.02 | 5.06 | 0.03 | 2.40 | 0.08 | 0.008 | 0.0005 |
| 6 | 6.98 | 0.03 | 4.89 | 0.02 | 1.80 | 0.08 | 0.008 | 0.0008 |
| 18 | 6.30 | 0.05 | 3.10 | 0.05 | 1.30 | 0.06 | 0.008 | 0.0008 |

Figure 5:
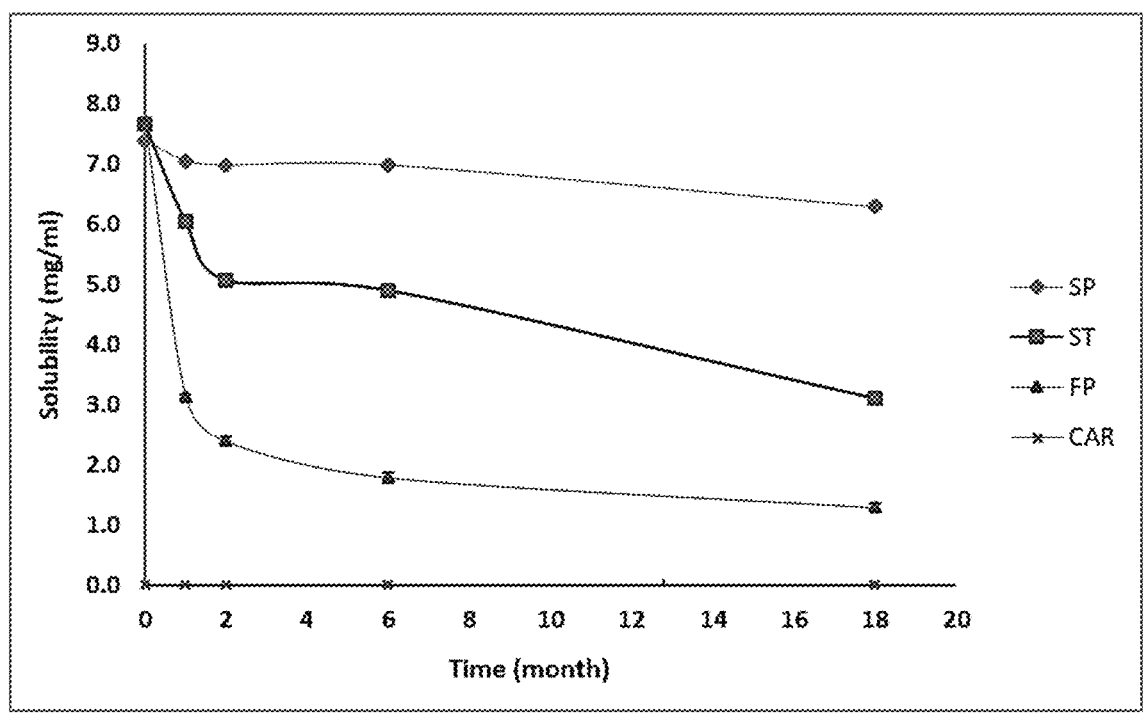
FIG. 5 illustrates a solubility profile of an exemplary carvedilol nanococrystal (CAR), slow freeze-dried carvedilol nanococrystal containing PEG (SP), slow freeze-dried carvedilol nanococrystal containing trehalose (ST), and fast freeze-dried carvedilol nanococrystal containing PEG (FP) within 18 months, consistent with one or more exemplary embodiments of the present disclosure.

FIG. 5 illustrates solubility profiles of different compositions of carvedilol, including pure carvedilol (CAR), a slow freeze-dried formulation of carvedilol nanococrystal containing PEG (SP), a slow freeze-dried formulation of carvedilol nanococrystal containing trehalose (ST), and a fast freeze-dried formulation of carvedilol nanococrystal containing PEG (FP) within 18 months as described in TABLE 5, consistent with one or more exemplary embodiments of the present disclosure.

Referring to TABLE 5 and FIG. 5, all carvedilol nanococrystal compositions (SP, ST, and FP) show water-solubility about 2000 times higher than pure carvedilol. It should be noted that the solubility of the SP formulation, which was produced using PEG 4000 as the lyoprotectant at a slow freezing rate, remains relatively unchanged up to 18 months.

Figure 6A:
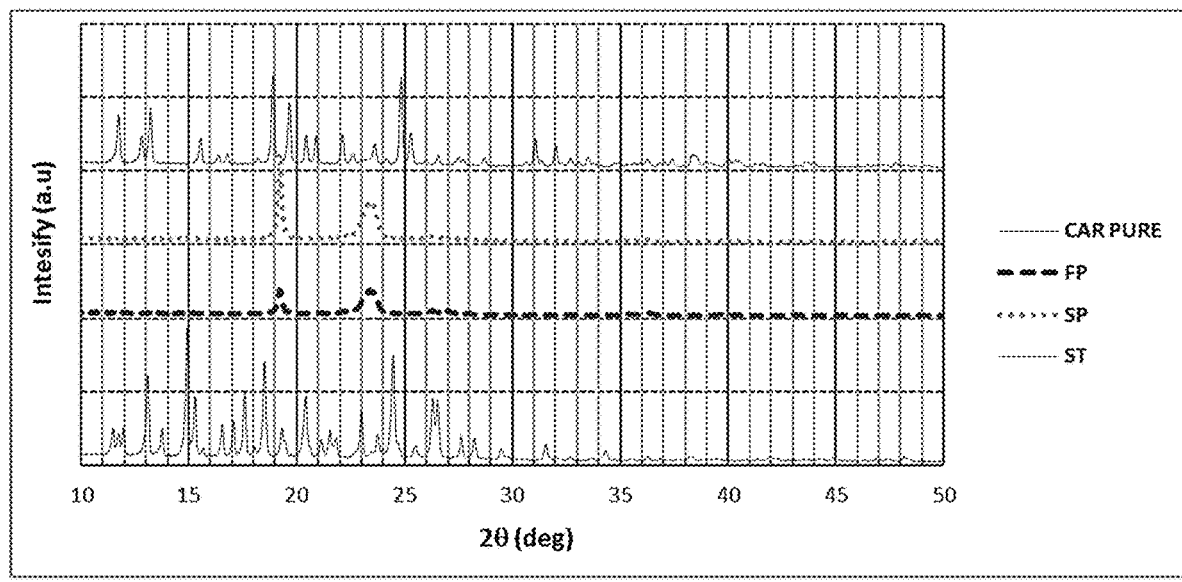
FIG. 6A illustrates powder X-ray diffraction (PXRD) spectra at day one of a slow freeze-dried carvedilol nanococrystal containing PEG (SP), a slow freeze-dried carvedilol nanococrystal containing trehalose (ST), a fast freeze-dried carvedilol nanococrystal containing PEG (FP), and pure carvedilol (CAR PURE), consistent with one or more exemplary embodiments of the present disclosure.

Example 5: Thermal and Diffraction Spectroscopy of an Exemplary Carvedilol Nanococrystal Composition In this example, the structure of an exemplary carvedilol nanococrystal composition was examined using powder x-ray diffraction (PXRD) spectroscopy and differential scanning calorimetry (DSC) techniques. FIG. 6A illustrates powder X-ray diffraction (PXRD) spectra at day one of a slow freeze-dried composition containing PEG of formulation 9 of TABLE 1 for carvedilol nanococrystal (SP), a slow freeze-dried composition containing trehalose of formulation 9 of TABLE 1 for carvedilol nanococrystal (ST), a fast freeze-dried composition containing PEG of formulation 9 of TABLE 1 for carvedilol nanococrystal containing PEG (FP), and pure carvedilol (CAR PURE), consistent with one or more exemplary embodiments of the present disclosure.

Referring to FIG. 6A, PXRD studies show the typical crystalline peaks of carvedilol (CAR) (5.84°, 13.08°, 14.84°, 17.60°. 18.44°, and 24.32°) in slow-frozen trehalose containing formulation (08.89°, 13.20°, 18.92°, 24.82°, 24.85°, 18.87°, 24.79°, 18.94°, 24.87°, and 24.77°) indicating the crystalline structure of exemplary carvedilol nanococrystal composition and approving the formation of nanocrystals (NCCs). Also, the slow-frozen formulation containing PEG (SP) shows only 19° and 23° (2θ) peaks corresponding to the PEG, which indicates a loss of crystalline structure of carvedilol in the structure.

Figure 6B:
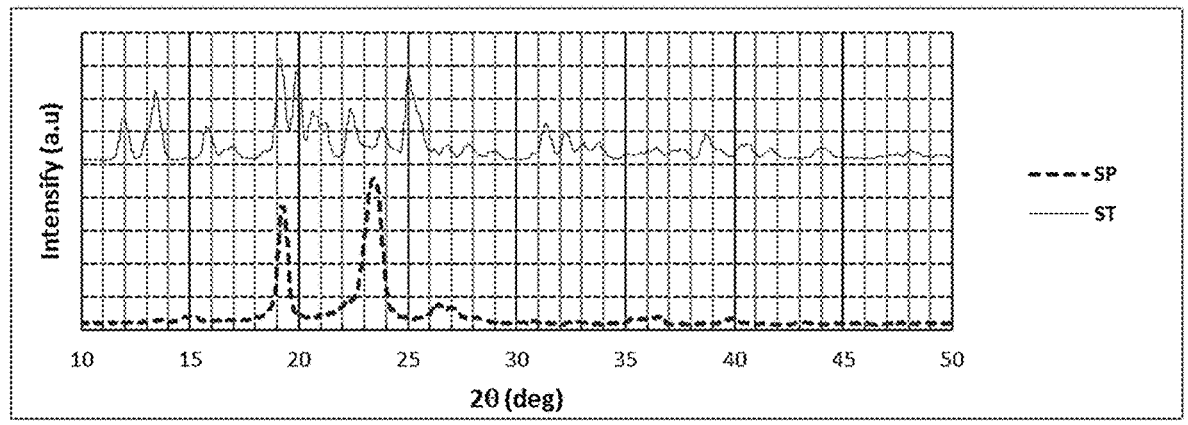
FIG. 6B illustrates PXRD spectra after six months of a slow freeze-dried carvedilol nanococrystal containing PEG (SP) and a slow freeze-dried carvedilol nanococrystal containing trehalose (ST), consistent with one or more exemplary embodiments of the present disclosure.

FIG. 6B illustrates PXRD spectra after six months of a slow freeze-dried composition containing PEG of formulation 9 of TABLE 1 for carvedilol nanococrystal (SP) and a slow freeze-dried composition containing trehalose of formulation 9 of TABLE 1 for carvedilol nanococrystal (ST), consistent with one or more exemplary embodiments of the present disclosure. Referring to FIG. 6B, the PXRD result indicates that all of the lyophilized formulations of exemplary carvedilol nanococrystal composition have structure stability after six months.

Figure 7:
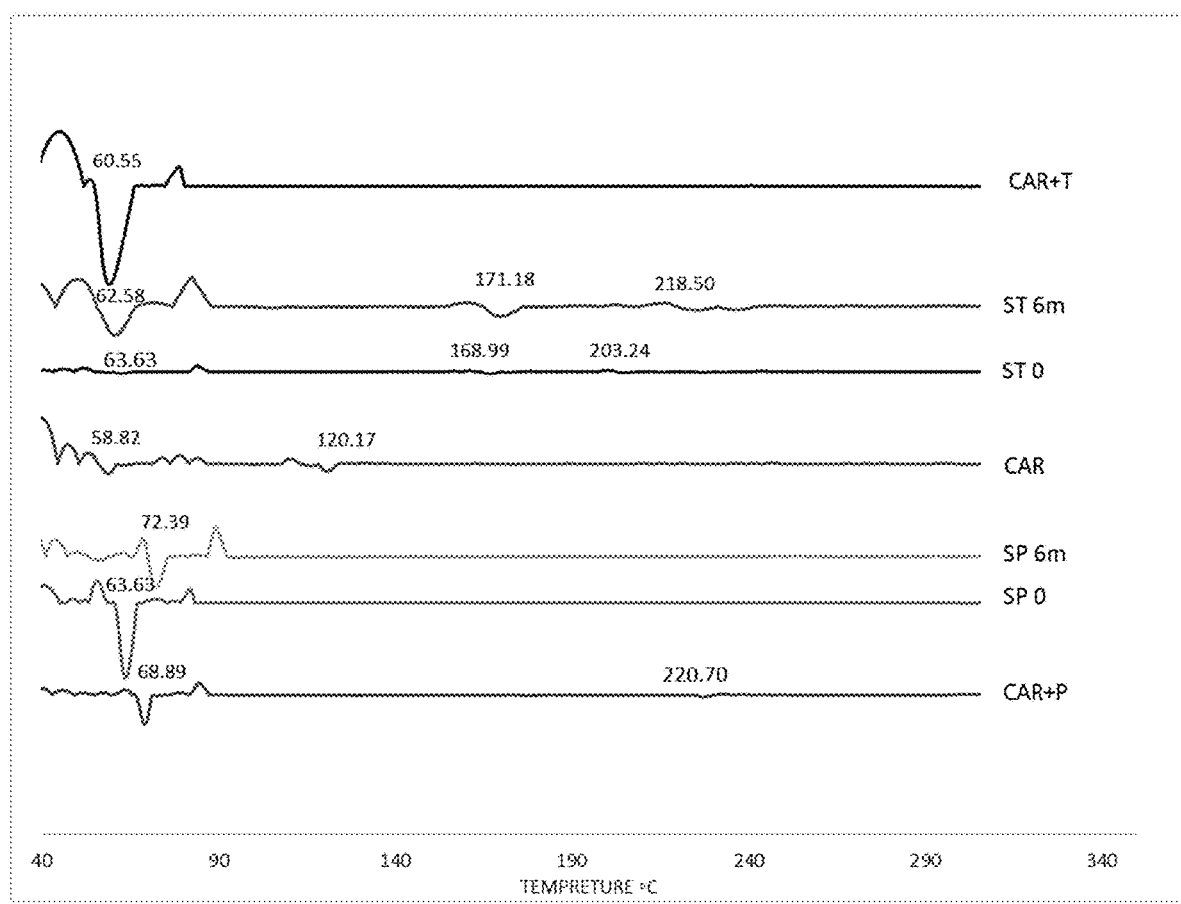
FIG. 7 illustrates DSC graphs of a mixture of carvedilol and trehalose (CAR+T), a slow freeze-dried carvedilol nanococrystal containing trehalose after 6 months (ST 6 m), a slow freeze-dried carvedilol nanococrystal containing trehalose at time of production (ST 0), pure carvedilol (CAR), a slow freeze-dried carvedilol nanococrystal containing PEG after 6 months (SP 6 m), a slow freeze-dried carvedilol nanococrystal containing PEG at time of production (SP 0), and a physical mixture of carvedilol and PEG (CAR+P), consistent with one or more exemplary embodiments of the present disclosure.

FIG. 7 illustrates DSC graphs of a mixture of carvedilol and trehalose (CAR+T), a slow freeze-dried composition containing trehalose of formulation 9 of TABLE 1 for carvedilol nanococrystal after 6 months (ST 6 m), a slow freeze-dried composition containing trehalose of formulation 9 of TABLE 1 for carvedilol nanococrystal at time of production (ST 0), pure carvedilol (CAR), a slow freeze-dried composition containing PEG of formulation 9 of TABLE 1 for carvedilol nanococrystal after 6 months (SP 6 m), a slow freeze-dried composition containing PEG of formulation 9 of TABLE 1 for carvedilol nanococrystal at time of production (SP 0), and a physical mixture of carvedilol and PEG (CAR+P), consistent with one or more exemplary embodiments of the present disclosure.

Referring to FIG. 7, DSC thermograms indicate that the trehalose-containing formulation (ST 0) structure is more crystalline than that of the PEG-containing formulation (SP 0). Also, after six months, the PEG-containing formulation (SP 6 m) shows a more stable structure than the trehalose-containing formulation (ST 6 m). It should be noted that the physical structure stability confirms the stability of solubility results, as shown in FIG. 5. According to the results, the slow freeze-dried carvedilol nanococrystal containing PEG (SP) has better results than the trehalose-containing formulation (ST) regarding high water solubility for a long time.

Example 6: Dissolution Rate of an Exemplary Curcumin Nanococrystal Composition

Figure 8:
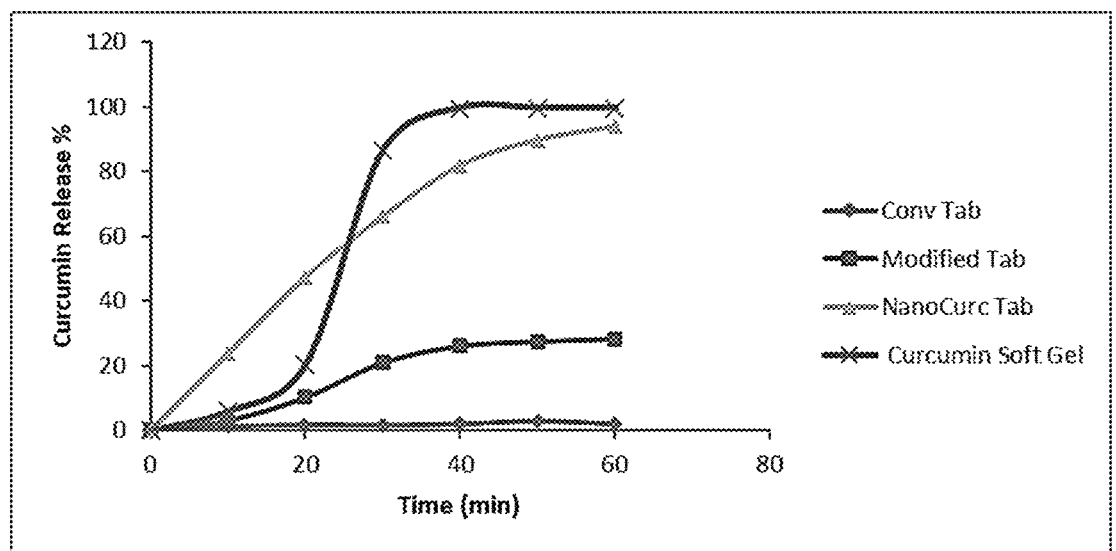
FIG. 8 illustrates a comparison between dissolution rates of an exemplary curcumin nanococrystal composition (NanoCure), a conventional curcumin tablet (Cony Tab), a more soluble tablet formulation of curcumin than Conv Tab prepared by incorporating solubilizing excipients including SLS and PVP (Modified Tab), and a soft gel capsule containing soluble curcumin in synthetic surfactants (Curcumin Soft Gel), consistent with one or more exemplary embodiments of the present disclosure.

In this example, the release of the curcumin from exemplary curcumin nanococrystal composition was examined by measuring the dissolution rates. FIG. 8 illustrates a comparison between dissolution rates of an exemplary curcumin nanococrystal composition (NanoCure), a conventional curcumin tablet (Conv Tab), a more soluble tablet formulation of curcumin than Conv Tab prepared by incorporating solubilizing excipients including SLS and PVP (Modified Tab), and a soft gel capsule containing soluble curcumin in synthetic surfactants (Curcumin Soft Gel), consistent with one or more exemplary embodiments of the present disclosure.

Referring to FIG. 8, while conventional tablet (Conv Tab) shows nearly no curcumin release within 60 minutes, nanococrystal composition (NanoCure) releases about 100% curcumin within 60 minutes. Also, in the same period of time, the Modified Tab releases about 30% of its loaded curcumin. Regarding Curcumin Soft Gel, which uses Tween 80 as micelle-forming and curcumin dissolving agent, though about 100% curcumin release is observed within 60 minutes, a 20-minute lag time is observed, delaying the onset of action of compound significantly. Furthermore. Tween 80 has been known as one of the most allergic compounds in drug preparations. The other limitations include the difficulty of swallowing large soft gel capsules, particularly in elderly patients, hypersensitivity to collagen of capsules, the high cost of soft gel capsules, and the unavailability of soft gel capsule filling machines in most pharmaceutical companies.

Example 7: Synthesis of Water-Free Liquid Form of an Exemplary Curcumin Nanococrystal Composition In this example, a water-free liquid formulation of exemplary curcumin nanococrystal composition was synthesized as follows. At first, a first solution was formed by dissolving curcumin with a concentration of about 60 mg/ml and tartaric acid with a concentration of about 30 mg/ml in acetone. Then, a second solution was formed by dissolving PVP with a concentration of about 60% w/v in different liquid low-molecular-weight PEGs, like PEG200, PEG400, and PEG600. Thus, the ratio of the acetone to PEG was about 1:1. In the next step, a concentrated formulation of exemplary curcumin nanococrystal composition was formed by dropwise adding the first solution to the second solution and mixing using a probe sonicator at a constant power of about 400 W for a time period of about 5 minutes. After 5 minutes, the sonication was stopped, and the concentrated formulation of exemplary curcumin nanococrystal composition was stirred using a magnet stirrer at speed between 500 RPM and 1500 RPM for 4 hours to remove acetone.

Figure 9:
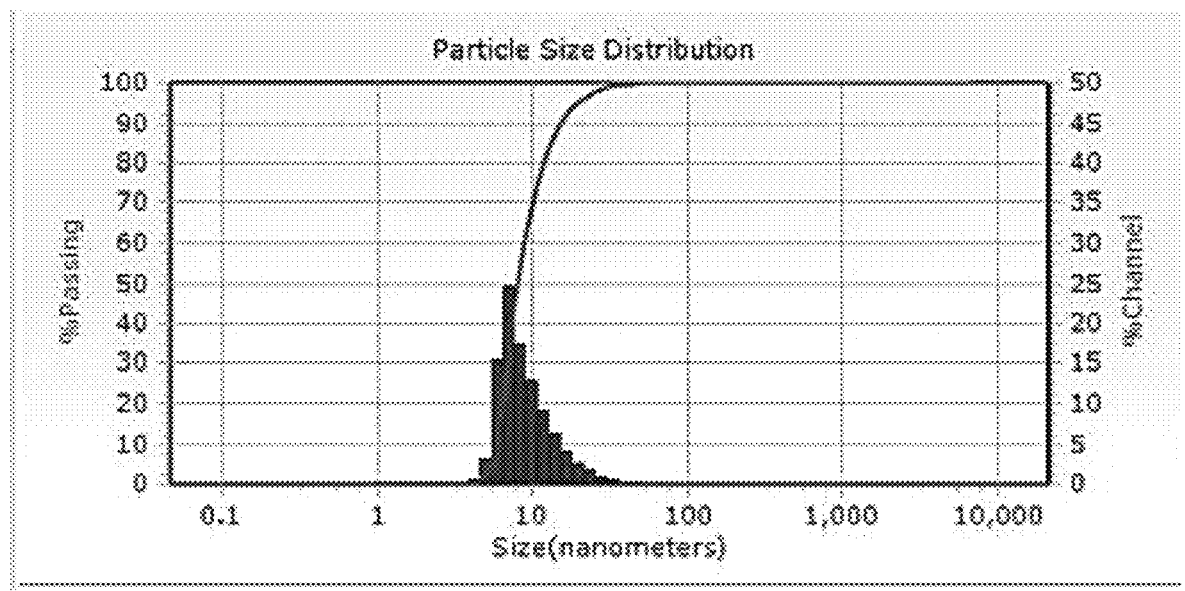
FIG. 9 illustrates a particle size distribution of an exemplary water-free liquid curcumin nanococrystal after 1:10 dilution with normal saline obtained by DLS, consistent with one or more exemplary embodiments of the present disclosure.

FIG. 9 illustrates PS distribution of exemplary water-free liquid curcumin nanocrystal after 1:10 dilution with normal saline obtained by DLS, consistent with one or more exemplary embodiments of the present disclosure. Referring to FIG. 9, the DLS result indicates that the PS of the concentrated formulation of exemplary curcumin nanococrystal composition after 10-fold dilution with phosphate-buffered saline (pH=7.4) was less than 10 nm is equivalent to the PS of soluble macromolecules of plasma, like albumin.

The synthesized concentrated formulation of exemplary curcumin nanococrystal composition had a yellow color and could be intravenously administered by resuspending 300 mg of exemplary curcumin nanococrystal composition with 45 ml of normal saline. After diluting the concentrated formulation of exemplary curcumin nanococrystal composition, which was synthesized using PEG60) with phosphate-buffered saline (pH=7.4), the diluted composition became turbid, indicating PSs larger than 100 nm; however, the formulations synthesized using PEG200 and PEG400 were transparent after dilution with normal saline and water. Moreover, the concentrated form like lyophilized nanococrystals can be formulated as candy, toffee, lozenge, oral solution, topical gel, oleogel, cream, ointment, dermal and buccal film, cleansing gels, soaps, and shampoos.

Example 8: Synthesis of an Exemplary Aprepitant Nanocrystal Composition

In this example, exemplary aprepitant nanococrystal composition was synthesized utilizing a process similar to exemplary method 100 presented in FIG. 1A. Exemplary aprepitant nanococrystal composition was synthesized using TA as a coformer, SLS, PVP, and poloxamer as stabilizers. Also, acetone was used as a first solvent, and water was used as a second solvent.

In this example, the ultrasonic/stirring nanoprecipitation technique was chosen for synthesizing exemplary aprepitant nanococrystal composition. TABLE 6 represents different formulations of exemplary aprepitant nanococrystal composition. Initially, a first solution was formed by dissolving aprepitant (APR) and tartaric acid in acetone. Also, a second solution was formed by dissolving the stabilizer in water. Finally, the volume ratio of the water (second solvent) to acetone (first solvent)(SR) was about 7.5.

In the next step, aprepitant nanocrystal dispersion was formed by dropwise addition of the first solution to the second solution and mixing using a probe sonicator at a constant power of about 400 W for a time period of about 5 minutes. After 5 minutes, the sonication was stopped, and the aprepitant nanocrystal dispersion was stirred for 4 hours to remove acetone. In the end, lyophilized formulations of exemplary aprepitant nanococrystal composition were prepared by slow freeze-drying the aprepitant nanococrystal dispersion at a temperature of about −70° C. for a time period of about 24 hours using PEG as the lyoprotectant at a concentration of about 2% w/v.

TABLE 6

Different formulstions of exemplary aprepitant nanococrystal composition.

| Formulation number | APR (mg/ml) | TA (mg/ml) | SLS (% w/v) | PVP (% w/v) | Poloxamer (% w/v) | PVA (% w/v) | PS (nm) |
|---|---|---|---|---|---|---|---|
| 1 | 10 | 5 | — | — | 1 | — | aggregate |
| 2 | 10 | 5 | — | — | — | 1 | aggregate |
| 3 | 10 | 5 | — | 1 | — | — | aggregate |
| 4 | 10 | 5 | 1 | — | — | — | 0.970 |
| 5 | 20 | 10 | 1 | — | — | — | 450 |
| 6 | 30 | 15 | 1 | — | — | — | 890 |
| 7 | 40 | 20 | 1 | — | — | — | aggregate |
| 8 | 30 | 15 | 2 | — | — | — | 0.970 |
| 9 | 40 | 20 | 2 | — | — | — | 0.970 |
| 10 | 40 | 20 | 2.5 | — | — | — | 0.970 |

Referring to TABLE 6, formulations 8-10 showed the smallest particle size of exemplary aprepitant nanococrystal composition, which is about 0.97 nm; as a result, formulations 8-10 are practically considered a solution. The PS of exemplary aprepitant nanococrystal composition was examined before and after freeze-drying.

TABLE 7

Effect of freeze-drying on the particle size of exemplary aprepitant nanococrystal composition of TABLE 6.

| Formulation number | PEG (% w/v) | Particle size (nm) ± SD | |
|---|---|---|---|
| | | Before freeze-drying | After freeze-drying |
| Formulation 8 | 2 | 0.970 | 0.98 ± 0.1 |
| Formulation 9 | 2 | 0.970 | 158 ± 1 |
| Formulation 10 | 2 | 0.970 | 1.2 ± 02 |

Figure 10A:
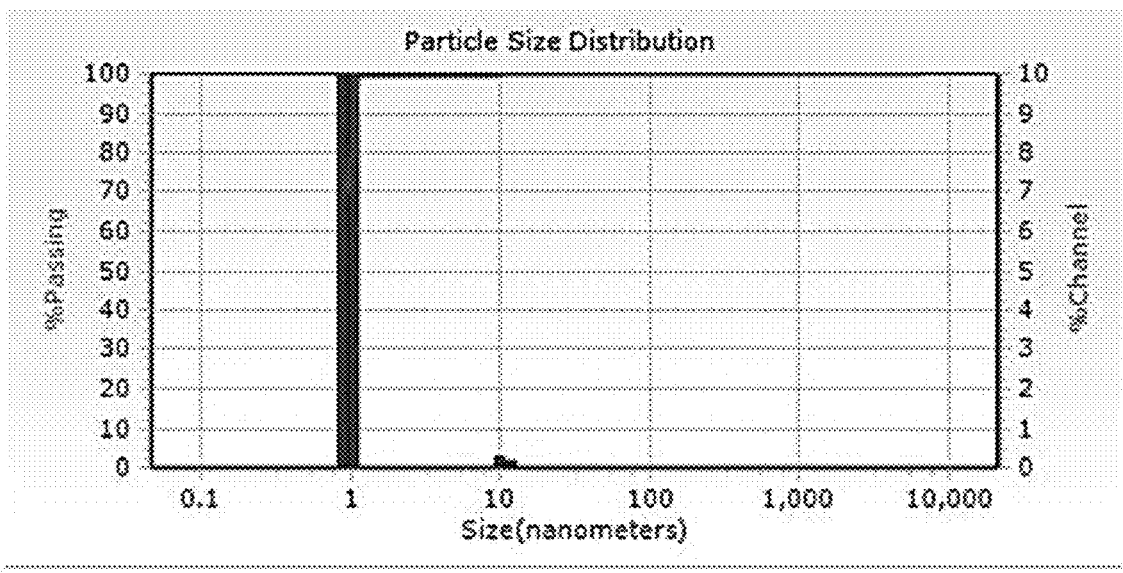
FIG. 10A illustrates a PS distribution of an exemplary aprepitant nanococrystal composition before freeze-drying using DLS, consistent with one or more exemplary embodiments of the present disclosure.
Figure 10B:
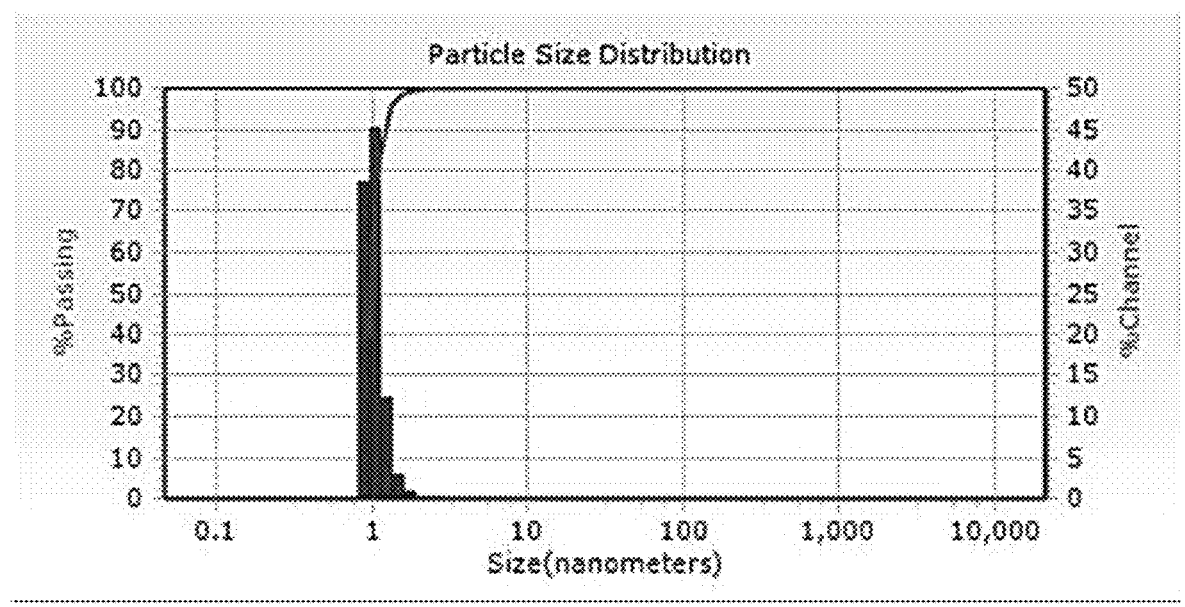
FIG. 10B illustrates a PS distribution of an exemplary aprepitant nanococrystal composition after freeze-drying using DLS, consistent with one or more exemplary embodiments of the present disclosure.

FIG. 10A illustrates a PS distribution of formulation 8 of TABLE 6 for exemplary aprepitant nanococrystal composition before freeze-drying using DLS, consistent with one or more exemplary embodiments of the present disclosure. FIG. 10B illustrates a PS distribution of formulation 8 of TABLE 6 for exemplary aprepitant nanococrystal composition after freeze-drying using DLS, consistent with one or more exemplary embodiments of the present disclosure.

Referring to TABLE 7 and FIGS. 10A-10B, with selecting proper lyoprotectant, its concentration, and freezing rate, the lyophilization of aprepitant nanococrystals could produce ultrafine spherical nanoparticles with PS about 1 nm and narrow PS distribution which could achieve a fast and highly soluble form of drug for oral administration and also, makes the intravenous injection of formulation possible. Moreover, the solid nature of the formulation provides the product stability for long term storage.

While the foregoing has described what may be considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such away. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second, and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure and is not to be interpreted as reflecting an intention that the claimed implementations require more features than are expressly recited in each claim. Rather, as the following claims reflect, the inventive subject matter lies in less than all features of a single disclosed implementation. Thus, the following claims are hereby incorporated into the Detailed Description, with each claim standing on its own as a separately claimed subject matter.

While various implementations have been described, the description is intended to be exemplary, rather than limiting and it will be apparent to those of ordinary skill in the art that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in the light of the attached claims and their equivalents. Also, various modifications and changes may be made within the scope of the attached claims.

What is claimed is:

1. A curcumin nanococrystal composition, comprising:
   curcumin with a water-solubility between 5 mg/ml and 20 mg/ml;
   a coformer comprising tartaric acid;
   a stabilizer with a concentration between 50% and 90% of weight of the curcumin nanococrystal composition, the stabilizer comprising poloxamer 188; and
   a lyoprotectant, the lyoprotectant comprising polyethylene glycol (PEG);
   wherein the curcumin nanococrystal composition has a particle size less than 10 nm,
   wherein:
      the curcumin nanococrystal composition comprises the curcumin and the coformer with a weight ratio of the curcumin to the coformer between 0.15 and 1.5;
      the curcumin nanococrystal composition has a particle size less than 1 nm;
      the curcumin nanococrystal composition comprises the curcumin with a concentration between 51% and 70% of weight of the curcumin nanococrystal composition;
      the curcumin nanococrystal composition comprises the coformer with a concentration between 3% and 25% of weight of the curcumin nanococrystal composition;
      the lyoprotectant has a concentration between 20% and 50% of weight of the curcumin nanococrystal composition;

the curcumin has a water-solubility between 5 mg/ml and 20 mg/ml for at least 6 months at a temperature between 5° C. and 30° C.; and the curcumin nanococrystal composition is administered to a patient through at least one of intravenous injection, intranasal administration, inhalation administration, buccal administration, sublingual administration, topical administration, and oral administration.

2. A method for synthesizing curcumin nanococrystal composition of claim 1, the method comprising:

producing the curcumin nanococrystal composition with a particle size less than 10 nm and with a water solubility of curcumin between 5 mg/ml and 20 mg/ml by:

forming a first solution by dissolving curcumin and a coformer in a first solvent, the coformer comprising tartaric acid, the first solvent comprising N-methyl-2-pyrrolidone;

forming a curcumin nanococrystal dispersion by mixing the first solution with a second solution, mixing the first solution with the second solution comprising sonicating the first solution with the second solution, the second solution comprising a stabilizer with a concentration between 1% w/v and 15% w/v and a second solvent, the stabilizer comprising poloxamer 188, the second solvent comprising low-molecular-weight liquid polyethylene glycol (PEG); and solidifying the curcumin nanococrystal dispersion by spray-drying the curcumin nanococrystal dispersion.

3. The method of claim 2, wherein dissolving the curcumin and the coformer in the first solvent comprises dissolving the curcumin and the coformer in the first solvent with a weight ratio of the curcumin to the coformer between 0.15 and 1.5.

4. The method of claim 2, wherein mixing the first solution with the second solution comprises mixing the first solution with the second solution with a ratio of the second solvent to the first solvent between 5 (v/v) and 10 (v/v).

5. The method of claim 2, wherein mixing the first solution with the second solution comprises at least one of stirring, high-shear mixing, and sonicating the first solution with the second solution.

6. The method of claim 2 further comprising solidifying the curcumin nanococrystal dispersion by at least one of freeze-drying and spray-drying the curcumin nanococrystal dispersion.

7. The method of claim 2, wherein freeze-drying the curcumin nanococrystal dispersion comprises conducting fast freeze-drying by placing the curcumin nanococrystal dispersion in liquid nitrogen or conducting slow freeze-drying by placing the curcumin nanococrystal dispersion at a temperature between −40° C. and −80° C. for a time period between 12 hours and 24 hours.

8. The method of claim 2, wherein freeze-drying the curcumin nanococrystal dispersion comprises freeze-drying the curcumin nanococrystal dispersion by adding a lyoprotectant to the curcumin nanococrystal dispersion, the lyoprotectant further comprising at least one of trehalose, mannitol, and sucrose.

9. The method of claim 2, wherein the stabilizer further comprises at least one of polyvinyl alcohol (PVA), hydroxypropyl methylcellulose (HPMC), polyvinylpyrrolidone (PVP), sodium lauryl sulfate (SLS), cholic acid, and deoxycholic acid.

10. The method of claim 2, wherein the first solution comprises the curcumin with a concentration between 30 mg/ml and 80 mg/ml.

11. The method of claim 2, wherein the first solution comprises the coformer with a concentration between 15 mg/ml and 40 mg/ml.

* * * * *